United States Patent

[11] 3,547,233

| [72] | Inventor | John H. Girvan |
|---|---|---|
| | | Mankato, Minn. |
| [21] | Appl. No. | 761,727 |
| [22] | Filed | Sept. 23, 1968 |
| [45] | Patented | Dec. 15, 1970 |
| [73] | Assignee | Minnesota Automotive, Inc. |
| | | Mankato, Minn. |
| | | a corporation of Minnesota |

[54] PRESSURE AND WEAR COMPENSATOR FOR CALIPER DISK BRAKE
9 Claims, 6 Drawing Figs.

[52] U.S. Cl. ........................................ 188/170,
118/72.3, 188/106, 188/196
[51] Int. Cl. ........................................ F16d 65/24,
F16d 55/22
[50] Field of Search .......................... 188/106,
106F,P, 170, 196A, 72.3

[56] References Cited
UNITED STATES PATENTS

| 2,809,723 | 10/1957 | Howze ........................ | 188/170X |
| 3,033,325 | 5/1962 | Tjernstrom .................. | 188/170 |
| 3,095,067 | 6/1963 | Murty et al. ................. | 188/170 |

Primary Examiner—Duane A. Reger
Attorney—Merchant & Gould

ABSTRACT: A fluid pressure operated brake mechanism having a brake element connected to a primary piston that is moved in a brake-applying direction by spring means and in a brake release direction by fluid pressure. A compensator piston, backing up the spring means, is operated by fluid pressure to maintain a predetermined bias of the spring means when the brake element becomes worn. A secondary piston is selectively operative to move the brake element in a brake-applying direction under fluid pressure independently of the spring means.

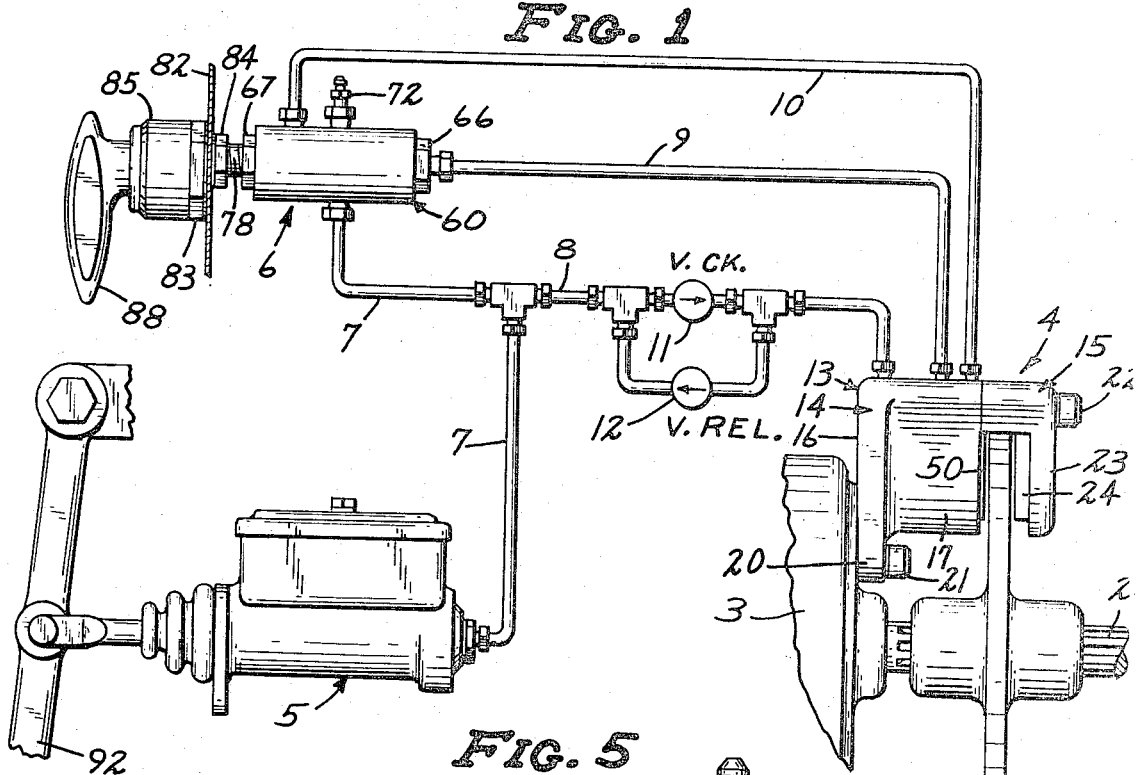
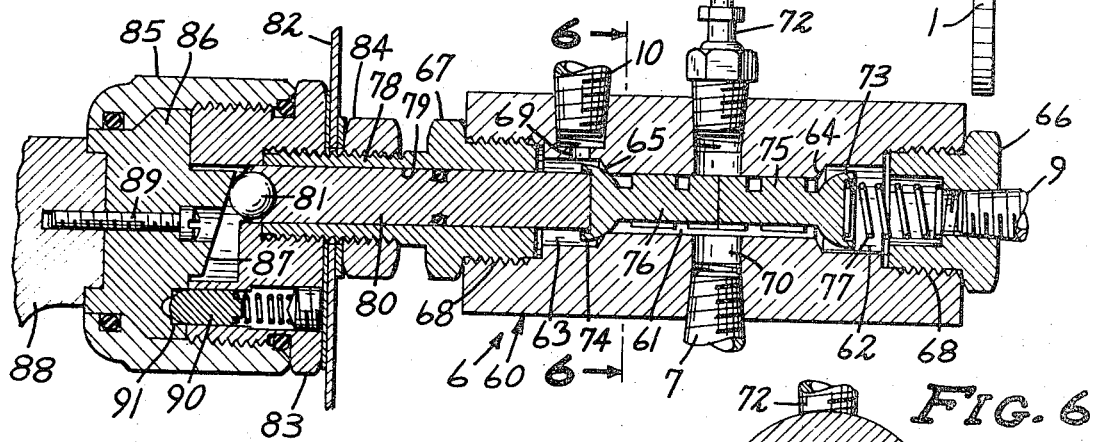
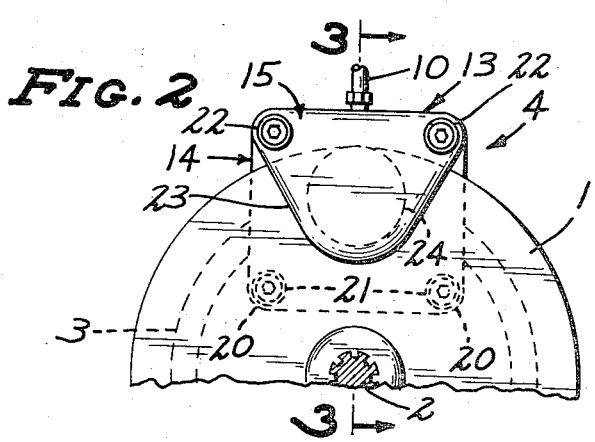
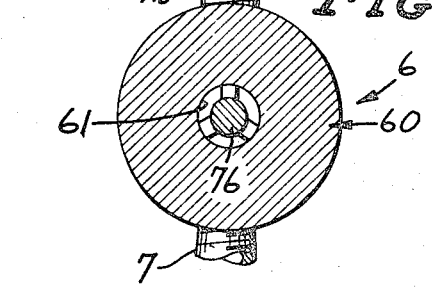

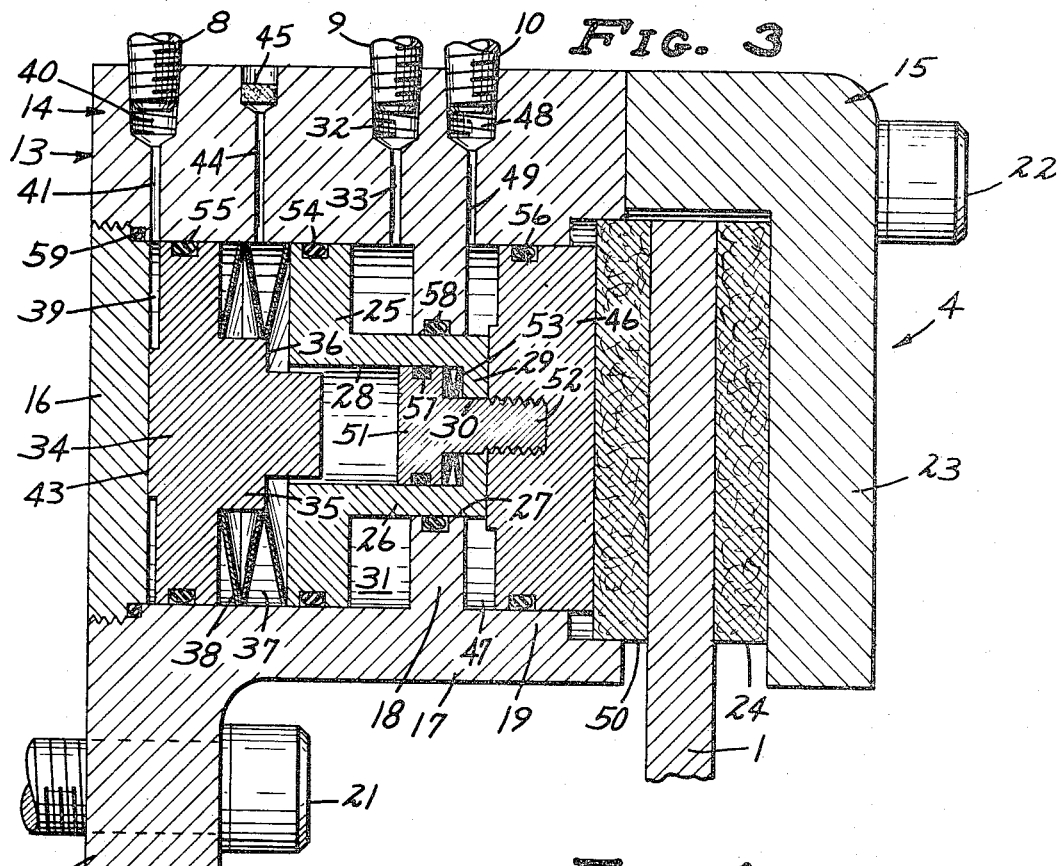
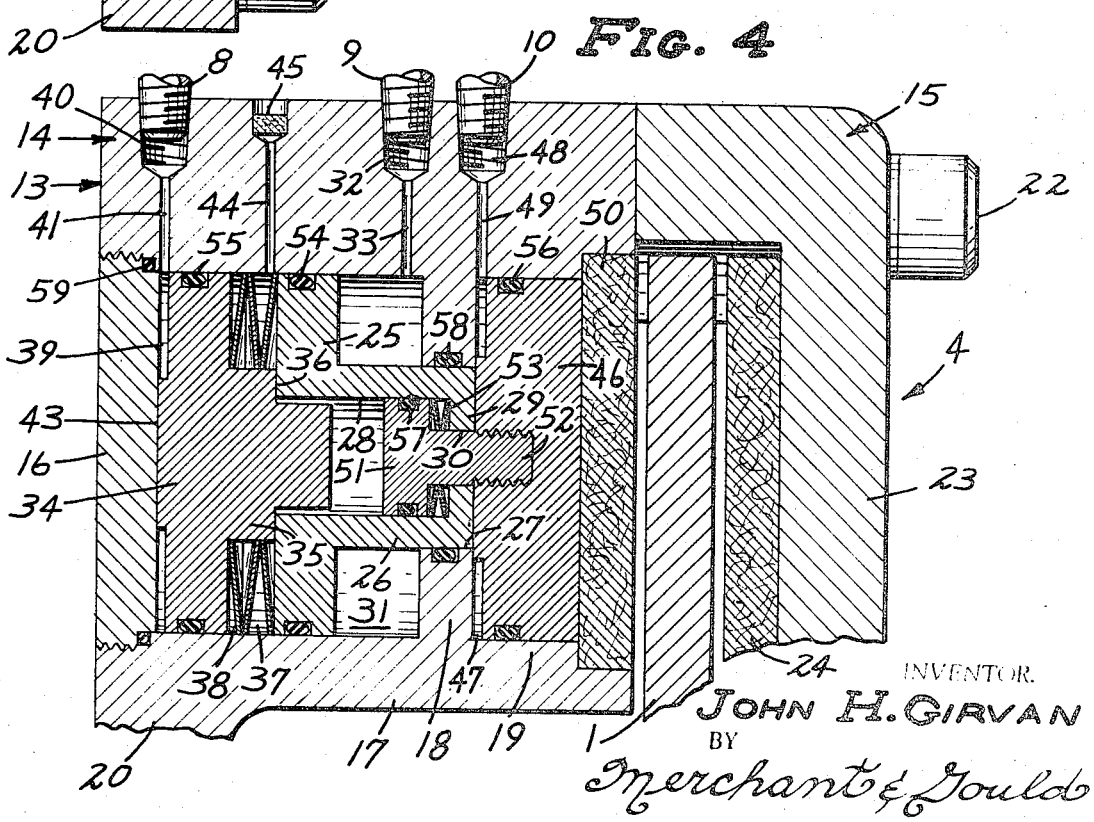

3,547,233

PRESSURE AND WEAR COMPENSATOR FOR CALIPER DISK BRAKE

An important object of this invention is the provision of a highly simplified fluid pressure operated brake having novel means for compensating for wear of a brake element or distortion or expansion due to heat generated in a brake drum or wheel.

Another object of this invention is the provision of a brake as set forth, wherein the brake is applied by spring means and released by fluid pressure, and having means for maintaining a predetermined bias of the spring means.

Another object of this invention is the provision of a brake having fluid pressure operated means for releasing the brake, spring means and fluid pressure operated means for applying the brake selectively and independently of each other, and second spring means for releasing the brake when said fluid pressure operated means is utilized to apply the brake.

Still another object of this invention is the provision of a brake mechanism which is applicable to drum-type brakes as well as disc brakes.

To the above ends, I provide a housing defining a cylinder having a pair of axially spaced primary and compensator pistons therein to provide axially spaced primary pressure, spring and compensating chambers, a brake element connected to the primary piston, and spring means in the spring chamber exerting axial bias against the primary and compensating pistons to move the primary piston in a forward brake applying direction toward operative engagement of the brake element with a rotary brake member. The housing defines fluid passages for connection to a fluid pressure source, the passages leading to different ones of the primary pressure and compensating chambers, pressure in the compensating chamber moving the compensator piston toward the primary piston to maintain a predetermined bias of the spring means against the primary piston, thus compensating for wear of the brake member engaging portion of the brake element. A secondary brake operating piston is mounted in said housing and is operatively connected to the primary piston, the secondary piston defining with the housing a secondary pressure chamber connected with the fluid pressure source. Selector valve means is provided to direct fluid under pressure selectively to the primary and secondary pressure chambers, whereby the brake element is moved in a brake applying direction selectively by said spring means and by fluid pressure. Second spring means between said primary and secondary pistons is operative to move the brake element in a brake releasing direction when the brake is applied by fluid pressure in the secondary pressure chamber.

DESCRIPTION OF THE DRAWINGS

FIG. 1 is a view partly in side elevation and partly diagrammatic, of a brake system incorporating the brake of this invention, some parts being broken away;

FIG. 2 is an enlarged view in end elevation of the brake of FIG. 1, some parts being broken away;

FIG. 3 is an axial section taken on the line 3—3 of FIG. 2, some parts being broken away;

FIG. 4 is a view corresponding to FIG. 3 but showing a different position of some of the parts;

FIG. 5 is an enlarged view in axial section of the selector valve of FIG. 1; and FIG. 6 is an enlarged transverse section taken on the line 6—6 of FIG. 5.

DETAILED DESCRIPTION

In the preferred embodiment of the invention illustrated, a brake system is shown in FIG. 1 as comprising a rotary braking member in the nature of a rotary disc 1 mounted for common rotary movements with and for axial sliding movements on a rotary shaft 2 that is journaled in a stationary structure 3, a caliper brake assembly 4, a convention master brake cylinder 5, and a selector valve indicated generally at 6. Conduit means interconnecting the brake assembly 4, master cylinder 5 and selector valve 6 includes a primary conduit 7 connecting the master cylinder 5 with the selector valve 6, a branch conduit 8 extending from the primary conduit 7 to the brake assembly 4, and primary and secondary conduits 9 and 10 respectively, extending from the brake assembly 4 to the selector valve 6. A one-way check valve 11 is interposed in the branch conduit 8, as is a pressure relief valve 12 that is shunted around the check valve 11. The valves 11 and 12 are conventional in nature, and the purpose thereof will be hereinafter described.

The caliper brake assembly 4 includes a housing 13 comprising a pair of cooperating housing sections 14 and 15, the housing sections 14 having a rear end wall 16 and a generally cylindrical wall 17, the rear end wall 16 being in the nature of a plug, screw threaded into the rear end of the housing section 14. The housing section 14 further includes an annular wall 18 forwardly axially spaced from the rear end wall 16, and a front cylindrical wall portion 19 extending forwardly of the annular wall 18. The housing section 14 is formed to provide one or more mounting lugs 20 having openings therein for reception of machine screws 21 whereby the brake assembly 4 is rigidly mounted on the stationary structure 3. The housing section 15 is secured to the front end of the housing section 14 by machine screws 22, and is formed to provide a depending portion 23 in forwardly spaced relation to the housing section 14, the braking member or disc 1 rotating between the front end of the housing section 14 and the depending portion 23 of the housing section 15. The depending portion 23 has mounted thereon a fixed brake element 24 for frictional engagement with the adjacent side of the disc 1.

A primary piston 25 is axially movably mounted in the housing section 14 between the rear end wall 16 and annular wall 18, and is formed to provide an elongated cylindrical hub 26 that extends axially forwardly through an axial opening 27 defined by the annular housing wall 18. The primary piston 25 and hub 26 define a rearwardly opening axial recess 28, the front end of which is defined by an annular front end wall 29 of the hub 26, the front end wall 29 defining an axial passage 30. The primary piston 25, with its hub 26, cooperates with the cylindrical wall 17 and annular wall 18 to define an annular primary pressure chamber 31 that communicates with a port 32 in the housing section 14 by means of a fluid passage 33.

A compensator piston 34 is axially slidably mounted in the housing section 14 between the rear end wall 16 and primary piston 25, and is formed to provide spacer means in the nature of a forwardly axially projecting hub portion 35 defining a shoulder 36 that is adapted to engage the adjacent side of the primary piston 25 to maintain a minimum spacing between the compensator piston 34 and the primary piston 25. The primary and compensator pistons 25 and 34 respectively, hub portion 35 and cylindrical wall 17, cooperate to define an annular spring chamber 37 in which is mounted compression spring means in the nature of a plurality of annular spring washers commonly known as Belleville washers 38 that yieldingly urge the pistons 25 and 34 axially away from each other. The compensator piston 34, housing end wall 16 and cylindrical wall 17 cooperate to define a compensating chamber 39 that communicates with a port 40 by means of a fluid passage 41. The secondary conduit 9 is connected to the port 32 and the branch conduit 8 to the port 40 by means of conventional fittings. As shown in FIGS. 3 and 4, the compensator piston 34 is formed to provide a rearwardly projecting hub or boss 43 that engages the rear end wall 16 to limit rearward movement of the compensator piston 34. Also, as shown in FIGS. 3 and 4, the housing section is drilled to provide a vent passage 44 leading from the spring chamber 37 to atmosphere exterior of the housing 13 through a filter element 45 in the vent passage 44.

A secondary piston 46 is axially movable in the housing section 14 forwardly of the annular wall 18, and cooperates with the front end portion of the hub 26, annular wall 18 and front cylindrical wall portion 19 to define an annular secondary pressure chamber 47 that is connected to a port 48 in the housing section 14 by a fluid passage 49. The secondary conduit 10 is connected to the port 48 by another fitting. A movable brake element 50 is rigidly secured to the secondary piston 46 by suitable means, not shown, in opposed relationship to the fixed brake element 24 and disposed adjacent the opposite side of the rotary brake member of disc 1. The secondary piston 46 is operatively connected to the primary piston 25 by a retractor piston 51 that is axially movably mounted in the recess 28 and which is provided with an axially forwardly projecting piston rod 52 that extends through the axial passage 30 and which is screw threaded into the secondary piston 46. Compression spring means in the nature of Belleville washers 53 are interposed between the retractor piston 51 and the hub end wall to yieldingly urge the retractor piston 51 in a rearward direction to move the secondary piston 46 into abutting engagement with the front end wall 29. The several piston 25, 34, 46 and 51 are formed to provide radially outwardly opening circumferential channels in which are mounted respective sealing rings 54, 55, 56 and 57. The annular wall 18 is likewise provided with a radially inwardly opening channel in which is mounted a sealing ring 58 that engages the hub 26. A sealing ring 59 effectively seals the threaded joint between the rear end wall 16 and the housing section 14.

With use of suitable valve means, such as the selector valve 6, the brake assembly 4 may be operated to apply rotary brake member or disc 1 by pressure of the Belleville washers 38, using fluid pressure in the primary pressure chamber 31 to release the braking effort against bias of the Belleville washers 38 and selectively, by hydraulically locking the primary piston 25 against forward brake-applying movement while simultaneously admitting fluid under pressure to the secondary pressure chamber 47 to advance the piston 46 against bias of the Belleville washers 53, the washers 53, the washers 53 releasing braking pressure on the disc 1 responsive to decrease in fluid pressure in the chaMber 47.

The selector valve 6 comprises a valve body 60 having an axial bore or passage 61 therethrough, the passage 61 therethrough, the passage 61 being counterbored at its opposite ends to provide fluid chambers 62 and 63 and respective valve seats 64 and 65, see FIG. 5. A pair of fittings 66 and 67 are screw threaded into diametrically enlarged threaded portion 68 at opposite ends of the passage 61, the fitting 66 being connected to the secondary conduit 9. A fluid passage 69 leads from the chamber 63 and communicates with the secondary conduit 10. The valve body 60 is drilled through to provide a transverse passage 70 intermediate the valve seats 64 and 65, the passage 70 having screw-threaded opposite ends for reception of a fitting at one end which connects the primary conduit 7 to the passage 70. A conventional bleeder valve 72 is screw threaded into the opposite end of the transverse passage 70. A pair of vaLve elements 73 and 74 are each disposed in a respective one of the fluid chambers 62 and 63 for seating engagement with the valve seats 64 and 65 respectively, and are formed to provide axially inwardly extending spiderlike valve stems 75 and 76 disposed in end-to-end abutting relationship in the passage 61 adjacent the intersection between the passage 61 and transverse passage 70. A coil compression spring 77 is interposed between the valve element 73 and fitting 66 to yieldingly urge the valve element 73 into seating engagement with its respective valve seat 64 and the valve element 74 out of seating engagement with its respective valve seat 65.

The fitting 67 is formed to provide an elongated externally threaded stem 78, the fitting 67 defining an axial passage 79 therethrough in axial alignment with the bore or passage 61 in the valve body 6. A push rod 80 is axially movably mounted in the passage 79 and has an inner end in engagement with the valve element 74, the outer end of the push rod forming an axially outwardly opening socket for reception of a ball bearing 81. The fitting 67 provides means for mounting the valve body 6 to a dash plate or mounting wall shown fragmentarily in FIG. 5, and indicated at 82, and has screw threaded on its outer end portion a hollow mounting head 83 that engages one side of the dashplate 82. A washer equipped lock nut 84 is also screw threaded on the stem 78 for operative engagement with the opposite side of the dashplate 82 whereby to securely mount the valve body 6 to the dashplate 82. The head 83 is externally threaded to receive a hollow cap 85 in which is journaled a rotary cam 86 having a cam surface 87 that engages the ball 81, the axis of rotation of the cam 86 being disposed in laterally offset parallel relationship to the axis of the push rod 80. A valve operating handle 88 is rigidly secured to the cam 86 for common rotation therewith by a machine screw or the like 89. As shown in FIG. 5, the cam surface 87 engages the ball 81 to move the push rod 80 and valve elements 73 and 74 against bias of the spring 77 to unseat the valve element 73 and seat the valve element 74. Rotation of the operating handle 88 and cam 86 from its position shown in FIG. 5 will permit the spring 77 to move the valve elements 73 and 74 and pushrod 80 to the left with respect to FIG. 5, whereby to seat the valve element 73 and unseat the valve element 74. A spring pressed detent element 90 is selectively received in a pair of circumferentially spaced recesses 91, one of which is shown, in the cam 86, to releasably hold the cam 86 in desired set positions of rotation thereof.

The fluid pressure source or master cylinder 5 is operated to pressurize the conduits 7—10 and fluid chambers 31, 39 and 47 by suitable means, such as a conventional brake pedal 92. Assuming that the operating handle 88, of the selector valve 6 is positioned as shown in FIG. 5, with the valve element 74 seated and the valve element 73 unseated, the Belleville washers 38 normally urge the primary piston 25 forwardly to cause braking pressure to be applied to the disc 1 by the brake elements 24 and 50. Then, when it is desired to release braking pressure against the disc 1, the brake pedal 92 is moved in a direction to pressurize the primary chamber 31 to move the primary piston 25 and parts connected thereto toward the compensator piston 34 until the secondary piston 46 engages the front side of the annular housing wall 18, as shown in FIG. 4. During fluid pressure imparted rearward movement of the primary piston 25, the Belleville washers 38 become compressed to a predetermined state of compression that is reached when the primary piston 25 engages the annular shoulder 36 of the compensator piston. At a time when the brake elements 24 and 50 are in a new or unworn state, the boss 43 on the compensator piston 34 is in substantial abutment with the rear end wall 16 when the primary piston 25 engages the shoulder 36 and the brake element 50 is fully retracted. It will be appreciated that dished spring washers, such as Belleville washers, have a limited effective spring length and that, as wear occurs in the brake elements 24 and 50, the washers 38 expand axially to a point wherein insufficient brake power is applied to the disc 1. As wear occurs in the brake elements 24 and 50, fluid under pressure is introduced into the compensating chamber 39 through the conduits 7 and 8 and check valve 11 each time the pedal 92 is operated to release the brake. As fluid accumulates in the compensating chamber 39, it is held therein by the one-way check valve 11, so that the compensator piston moves forwardly as wear occurs in the brake elements 24 and 50. The pressure relief valve 12 is set to relieve pressure in the compensating chamber 39 above a predetermined pressure, to prevent the compensator piston 34 from moving forwardly to a point where the primary piston cannot be fluid pressure retracted to disengage the brake disc 1. In practice, the relief valve 12 is set to permit an accumulation of pressure in the compensating chamber 39 just sufficient to compress the Belleville washers 38 to a point wherein the shoulder 36 of the compensator piston 34 engages the primary piston 25. It will be appreciated that, during the above-described operation of the brake system, the primary and secondary pistons 25 and 46, together with the movable brake element 50, move a very short distance between brake applied and brake released positions, the distance being normally in the neighborhood of .060 inches. Fluid in the secondary chamber 47 and secondary conduit 10, being under substantially no pressure during the above-described operation, this relatively small amount of movement of the secondary piston 46 and brake element 50 can occur to permit application or release of the brake mechanism before positive or negative pressure in the secondary chamber 47, fluid passage 49 and secondary conduit 10 builds up to a point wherein further movement of the secondary piston 46 is prevented thereby.

It will be appreciated that, when the brake mechanism is used as a spring applied, hydraulically released brake, its function is more or less that of a parking brake, such as that on an automotive vehicle. When it is desired to use the brake as a service brake for frequent stopping of a vehicle such as occurs when operating in congested areas, the brake is hydraulically applied and spring released, for such operation, the selector valve operating handle 88 and cam 86 are rotated to permit the compression spring 77 to seat the valve element 73 and unseat the valve element 74. When the brake pedal 92 is then manipulated to apply the brake, the secondary chamber 47 is pressurized to move the secondary piston 46 forwardly into engagement of the valve elements 24 and 50 with the disc 1, the retractor piston 51 also being moved forwardly with the secondary piston 46 against bias of the Belleville washers 53. During this time, the primary piston 25 is held against forward movement by fluid locked in the primary chamber 31. When fluid pressure is released in the secondary chamber 47, the Belleville washers 53 operates to retract the secondary piston 46 and its respective valve element 50 out of braking engagement with the brake member or disc 1.

As wear occurs in the brake elements 24 and 50 during fluid pressure applied, spring released, operation of the brake, fluid locked in the primary chamber 31 prevents forward wear compensator movement of the compensator piston 34 and primary piston 25 after engagement of the shoulder 36 with the primary piston 25. When the brake elements 24 and 50 become sufficiently worn so that full braking pressure does not occur therebetween and the brake member or disc 1, the operating handle 88 and its cam 86 are then rotated to their position of FIG. 5 to unseat the valve element 73, whereupon the Belleville washers 38 move the primary piston 25 forwardly into full braking engagement between the elements 24 and 50 with the disc 1. The operating handle 88 and cam 86 are then rotated to again seat the valve element 73 and unseat the valve element 74, whereby to reestablish communication between the secondary pressure chamber 47 and master cylinder 5, and hydraulically lock fluid in the primary pressure chamber 31. Then, when the brake pedal 92 is again manipulated to exert braking pressure in the secondary chamber 47, fluid is again introduced to the compensating chamber 39 to move the compensator piston 34 into engagement of the shoulder 36 thereof with the primary piston 25, recompressing the Belleville washers 38. The procedure may be repeated periodically until the brake elements 24 and 50 are worn to the point where replacement thereof is necessary.

It will be appreciated that the selector valve 6 may be of any desired design of three-way valve. Further, in installations wherein the brake disc 1 is fixed to a drive shaft 2 against axial movement, a second housing section 14 may be substituted for the housing section 15 and disposed in opposition to the housing section 14 with a suitable spacer therebetween, and the brake element 24 mounted on a second movable piston in the same manner as the brake element 50 above described.

I claim:

1. A fluid pressure brake comprising:
   a. a relatively fixed housing including means for mounting the same adjacent a relatively rotary brake member, and defining a cylinder having a cylindrical wall, a closed rear end wall, and an annular wall forwardly spaced from said rear end wall and having an axial opening therethrough;
   b. a primary piston axially slidable in said cylinder and including a reduced diameter hub having a front end portion projecting axially through said opening, said primary piston, cylindrical wall and annular wall cooperating to define an annular primary pressure chamber;
   c. a brake element;
   d. means securing said brake element to said primary piston hub end portion for axial movements therewith toward and away from braking engagement of said brake element with said relatively rotary brake member;
   e. a compensator piston axially movable in said cylinder between said closed end wall and said primary piston and cooperating with said cylindrical and end walls to define a compensating chamber;
   f. spacer means between said primary and compensator pistons for maintaining said pistons in predetermined minimum axially spaced apart relationship and cooperating with said pistons and cylindrical wall to define an annular spring chamber;
   g. and compression spring means in said annular spring chamber yieldingly urging said pistons axially apart whereby to move said primary piston forwardly in said housing toward operative engagement of said brake element with said rotary brake member; and
   h. said housing means defining a pair of passages for connection to a source of fluid under pressure, one of said passages leading to said primary pressure chamber, and other thereof leading to said compensating chamber.

2. A fluid pressure brake comprising:
   a. a relatively fixed housing including means for mounting the same adjacent a relatively rotary brake member and defining a cylinder having a cylindrical wall, a closed rear end wall, and an annular wall forwardly spaced from said rear end wall and having an axial opening therethrough;
   b. a primary piston axially slidable in said cylinder and including a reduced diameter hub having a front end portion projecting axially through said opening, said primary piston, cylindrical wall and annular wall cooperating to define an annular primary pressure chamber;
   c. a brake element;
   d. means securing said brake element to said primary piston hub end portion for axial movements therewith toward and away from braking engagement of said brake element with said relatively rotary brake member;
   e. a compensator piston axially movable in said cylinder between said closed end wall and said primary piston and cooperating with said cylindrical and end walls to define a compensating chamber;
   f. spacer means comprising a boss on one of said pistons extending axially toward the other of said pistons, said boss defining a shoulder engaging said other piston to limit relative movement toward each other and to maintain said pistons in predetermined minimum axially spaced apart relationship, said boss cooperating with said pistons and cylinder wall to define an annular spring chamber;
   g. and compression spring means in said annular spring chamber yieldingly urging said pistons axially apart whereby to move said primary piston forwardly in said housing toward operative engagement of said brake element with said rotary brake member, said spring means being compressed to a predetermined state of compression when said shoulder engages said other piston; and
   h. said housing means defining a pair of passages for connection to a source of fluid under pressure, one of said passages leading to said primary pressure chamber, and the other thereof leading to said compensating chamber.

3. The fluid pressure brake according to claim 2 in which said housing means defines a front cylindrical wall forwardly of said annular wall, said means securing the brake element to said hub portion including a secondary piston axially slidably engaging said front cylindrical wall and normally abutting the adjacent front end of said hub portion, said brake element being mounted on said secondary piston, said hub portion, secondary piston and annular and front cylinder walls cooperating to define an annular secondary pressure chamber, said housing defining a fluid passage for connection to said fluid source aNd leading to said secondary pressure chamber, whereby fluid under pressure may be introduced selectively to said secondary chamber to selectively utilize fluid pressure and said compression spring means to move said brake element in a forward brake member engaging direction.

4. The fluid pressure brake according to claim 3 in which said means securing the brake element to said hub portion further includes an axial interconnecting element fast on one of said hub portion and secondary piston and axially movable relative to the other of said hub portion and secondary piston, and yielding means urging said interconnecting element in a direction to move said secondary piston into abutting engagement with said hub portion.

5. The fluid pressure brake according to claim 4 in which said primary piston hub defines a cylindrical rearwardly opening axial recess, the front end portion of said hub having an axial passage therethrough to said recess, said interconnecting element comprising a retractor piston axially movable in said cylindrical recess and a reduced diameter piston rod extending forwardly through said axial passage and fixed to said secondary piston, said yielding means comprising annular secondary compression spring means interposed between said retractor piston and said front end of the hub portion and encompassing said piston rod, said retractor piston cooperating with said secondary compression spring means and front end of the hub to limit forward movement of said secondary piston and brake element relative to said primary piston.

6. A fluid pressure brake comprising:
 a. a relatively fixed housing including means for mounting the same adjacent a relatively rotary brake member, said housing defining a cylinder having a cylindrical wall, a closed rear end wall, and an annular wall forwardly spaced from said rear end wall and having an axial opening therethrough;
 b. a primary piston axially slidable in said cylinder and including a reduced diameter hub having a front end portion projecting axially through said opening, said primary piston, cylindrical wall and annular wall cooperating to define an annular primary pressure chamber;
 c. a brake element;
 d. means securing said brake element to said primary piston hub end portion for axial movements therewith toward and away from braking engagement of said brake element with said relatively rotary brake member;
 e. a compensator piston axially movable in said cylinder between said closed end wall and said primary piston and cooperating with said cylindrical and end walls to define a compensating chamber, said housing defining a pair of fluid passages each to a different one of said primary pressure and compensating chambers;
 f. spacer means between said primary and compensator pistons for maintaining said pistons in predetermined minimum axially spaced apart relationship and cooperating with said pistons and cylindrical wall to define an annular spring chamber;
 g. compression spring means in said annular spring chamber yieldingly urging said pistons axially apart whereby to move said primary piston forwardly in said housing toward operative engagement of said brake element with said rotary brake member; and
 h. and control means comprising a source of fluid under pressure and conduit means connecting said source with each of said fluid passages and including valve means exterior of said housing for maintaining a predetermined maximum pressure in said compensating chamber independently of the fluid pressure in said primary pressure chamber.

7. The fluid pressure brake according to claim 6 in which said valve means includes a one-way check valve for admitting fluid to said compensating chamber, and a pressure relief valve communicating with said compensating chamber independently of said check valve.

8. The fluid pressure brake according to claim 6 in which said housing means defines a front cylindrical wall forwardly of said annular wall, said means securing the brake element to said hub end portion including a secondary piston axially slidably engaging said front cylindrical wall and normally abutting the adjacent front end of said hub, said brake element being mounted on said secondary piston, said hub, secondary piston and annular and front cylinder walls cooperating to define an annular secondary pressure chamber, said housing defining a fluid passage leading from said secondary pressure chamber and connected to said conduit means, and a selector valve in said conduit means for directing fluid under pressure to said primary and secondary chambers selectively.

9. The fluid pressure brake according to claim 8 in which said conduit means comprises a primary conduit extending from said source to said selector valve, a branch conduit extending from said primary conduit to said compensating chamber passage and a pair of secondary conduits extending from said selector valve each to a different one of the fluid passages to said primary and secondary pressure chambers, said valve means including a check valve in said branch conduit